(12) United States Patent
Frederick

(10) Patent No.: US 7,956,892 B2
(45) Date of Patent: *Jun. 7, 2011

(54) METHOD OF DISTRIBUTING SPORTS ENTERTAINMENT

(75) Inventor: Paul J. Frederick, Rockville, MD (US)

(73) Assignee: U'R There! Entertainment, Ltd., Springfield, VA (US)

( * ) Notice: Subject to any disclaimer, the term of this patent is extended or adjusted under 35 U.S.C. 154(b) by 1304 days.

This patent is subject to a terminal disclaimer.

(21) Appl. No.: 11/518,435

(22) Filed: Sep. 11, 2006

(65) Prior Publication Data

US 2007/0008412 A1    Jan. 11, 2007

Related U.S. Application Data

(63) Continuation of application No. 09/452,952, filed on Dec. 2, 1999, now Pat. No. 7,106,360.

(60) Provisional application No. 60/148,072, filed on Aug. 10, 1999, provisional application No. 60/152,087, filed on Sep. 2, 1999.

(51) Int. Cl.
    *H04N 7/18* (2006.01)

(52) U.S. Cl. .................... 348/157; 348/143; 348/148

(58) Field of Classification Search .................. 348/143, 348/148, 157
    See application file for complete search history.

(56) References Cited

U.S. PATENT DOCUMENTS

| | | |
|---|---|---|
| 5,068,733 A | 11/1991 | Bennett |
| 5,565,908 A | 10/1996 | Ahmad |
| 5,570,126 A | 10/1996 | Blahut et al. |
| 5,600,368 A | 2/1997 | Matthews, III |
| 5,729,471 A | 3/1998 | Jain et al. |
| 5,793,872 A | 8/1998 | Hirayama et al. |
| 5,894,320 A | 4/1999 | Vancelette |
| 5,931,908 A | 8/1999 | Gerba et al. |
| 6,002,995 A | 12/1999 | Suzuki et al. |
| 6,578,203 B1 | 6/2003 | Anderson, Jr. et al. |
| 7,162,532 B2 | 1/2007 | Koehler et al. |
| 2001/0042105 A1 | 11/2001 | Koehler et al. |

OTHER PUBLICATIONS

NASCAR Racing Video Game Manual by Papyrus, 1994-1995, Papyrus Design Group, Inc., pp. 23-24.

*Primary Examiner* — Allen Wong
(74) *Attorney, Agent, or Firm* — Finnegan, Henderson, Farabow, Garrett & Dunner LLP

(57) ABSTRACT

A method for distributing sports entertainment includes the step of providing a plurality of video cameras positioned on vehicles or athletes that are participating in sporting events, transmitters for transmitting information from the plurality of cameras to a processing station, retransmission equipment for directing the camera feed from each of the plurality of cameras to separate channels for distribution and remote viewing at viewers' locations, and channel selectors that permit viewers to select from among the various channels, thereby allowing the viewers to select from the plurality of camera feeds. The cameras are simultaneously operated during the sporting event so as to generate a plurality of camera feeds during the event, each feed reflecting the perspective of an individual participant. The plurality of feeds is received by the retransmission equipment and retransmitted to selectable channels, each channel being associated with a respective camera feed. A viewer is thus allowed to select from the plurality of channels to thus enable his or her viewing of the sports event through the perspective of the participant of greatest interest to the viewer.

18 Claims, 2 Drawing Sheets

METHOD OF DISTRIBUTING SPORTS ENTERTAINMENT

CROSS REFERENCE TO RELATED APPLICATIONS

This application is a continuation application of U.S. application Ser. No. 09/452,952, filed Dec. 2, 1999, (now U.S. Pat. No. 7,106,360), which claims the benefit of U.S. Provisional Application No. 60/148,072, filed Aug. 10, 1999, and U.S. Provisional Application No. 60/152,087, filed Sep. 2, 1999, each of which is incorporated herein by reference in its entirety.

BACKGROUND OF THE INVENTION

I. Field of the Invention

This invention pertains to a method and related system for distributing sports entertainment.

II. Description of Related Art

Motorsports entertainment is one of the fastest growing fields of sports entertainment. Motorsports entertainment programs have long been produced and distributed to viewers remote from the site of the motorsports event through traditional means. Motorsports entertainment programs are typically produced through use of cameras stationed at various sites along the path taken by race cars or other motor vehicles. The producer selects camera feed to compile a program that is broadcast to all remote viewers.

In more recent years, producers have installed additional cameras that travel with the race cars or other participating vehicles. The cameras are mounted on various locations of the vehicles, and in some cases, are mounted on the helmets or other parts of the drivers' racing apparel. In various embodiments, the cameras are mounted on the exterior or within the interior of the vehicle, on the exterior or interior of a participant's helmet, or on the participant him or herself. The cameras are lightweight and durable so as to endure vibrations transmitted from the vehicles, and so as not to unduly interfere with the vehicles' performance. Stabilizing systems are provided so that the cameras record and/or broadcast stabilized views of the vehicle's environs.

The pictures taken by the vehicle-mounted cameras are transmitted to a receiving station by transmitting equipment carried by the vehicles and receiving equipment positioned at a receiving station. At the receiving station, the feed from the vehicle-mounted cameras becomes available to the producer, along with feed from the several other cameras that may be stationed along the track. The motorsports entertainment program is still compiled by the producer, who decides which of the various feeds is of interest at any particular point in time during the course of the motorsports event. Producers traditionally compile motorsports entertainment programs such that the feed from several different cameras are combined over the course of the event, wherein only a small portion of the program consists of feed from any particular vehicle.

The motorsports entertainment program is typically transmitted to viewers through network, cable, or satellite television transmissions as it is being produced. The remote viewer receives the program by selecting a designated channel, and the program received by the viewer is the same as the program as prepared by the producer. As such, the viewer is constrained by the feed selections that have been made by the producer, and has no ability to select the feed from a vehicle-mounted camera of particular interest to the viewer. The viewer's only choice is to watch or not watch the program as it has been produced.

The traditional prior art means of providing motorsports entertainment unduly constrains the viewer and prevents viewers from observing aspects of the motorsports entertainment event that are of particular interest. Many motorsports enthusiasts have a race car driver of primary interest, and would be primarily interested in viewing the motorsports event from the standpoint of the particular driver. For this large segment of the viewing public, the primary interest in viewing a particular event is not to view various positions of the track or view the track from the perspective of a variety of vehicles, but would be to view the track from the perspective of the driver of interest. Through this perspective, the viewer would be able to virtually ride with the driver of interest, experiencing the track and track conditions as viewed by the driver, experiencing the positioning of the driver's vehicle in relation to competing vehicles, and experiencing the excitement of the race from the perspective of the driver of greatest interest. The viewer would also be able to experience the interest and excitement first hand of events impacting the driver, such as near collisions, pit stops, and the like.

Other sports entertainment programming shares attributes of motorsports entertainment and is traditionally distributed in ways similar to that discussed above. However, as in motorsports entertainment, the distribution of these other sports entertainment events fails to provide viewers with the ability to select camera feed of greatest interest and excitement to the viewer. Thus, prior art methods have likewise been deficient in connection with the distribution of sporting events in the nature of a wide variety of sporting events, including but not limited to skiing, sledding events, horse racing, harness racing, football games, and the like. The present invention has applications in the distribution of those kinds of sports entertainment programming as well.

It is accordingly an object of the present invention to provide improved methodology for the distribution of motorsports entertainment programming and similar sports programs, wherein viewers are able to select vehicle-mounted or other participant-mounted camera feed of primary interest and excitement to the individual viewer.

It is a further object of the invention to provide a convenient and more efficient way of presenting advertising to viewers of sports programming.

It is a still further object of the present invention to provide a more efficient means for generating and assessing viewer purchases of sports entertainment programming.

BRIEF SUMMARY OF THE INVENTION

The present invention involves a system that includes a plurality of video cameras positioned on vehicles or athletes that are participating in sporting events, transmitters for transmitting information from the plurality of cameras to a processing station, retransmission equipment for directing each camera feed from each of the plurality of cameras to a separate channel for distribution and remote viewing at the viewers' locations, and selectors that permit viewers to select from among the various channels, thereby allowing the viewers to select from the plurality of camera feeds.

In practicing the distribution method of the invention, the plurality of cameras are simultaneously operated throughout the sporting event so as to generate a plurality of camera feeds throughout the event, each feed reflecting the perspective of an individual participant. The plurality of feeds is transmitted to the processing station and retransmitted as selectable channels, each channel being associated with a respective camera feed. The viewer selects from the plurality of channels to thus enable his or her viewing of the sports event through the perspective of the participant of greatest interest and excitement to the particular viewer.

DESCRIPTION OF THE PREFERRED EMBODIMENTS

Figure 1:
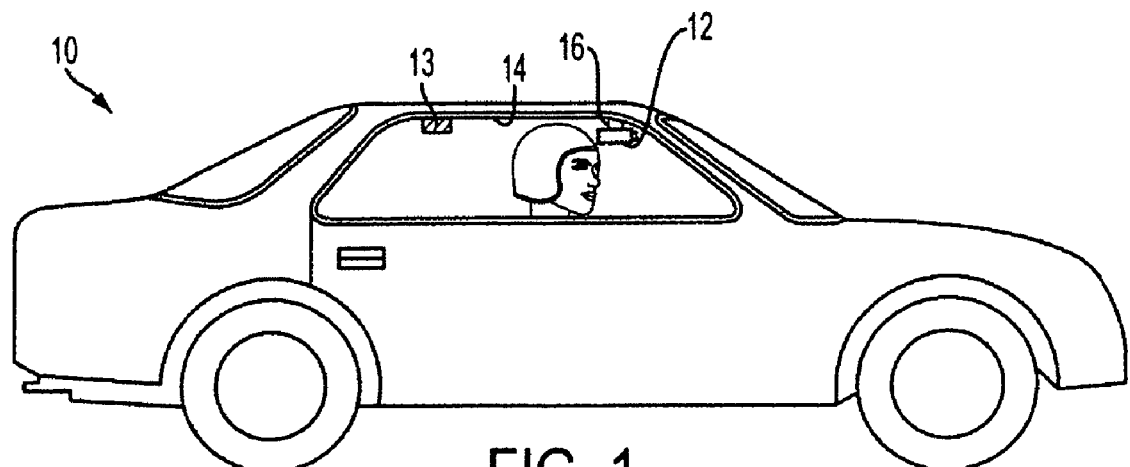
FIG. 1 is an elevational view of a race car participant in a motorsports entertainment event.

In accordance with a preferred embodiment of the present invention, FIG. 1 depicts a participant in a motorsports event. The participant is seated in a race car 10 in which camera 12 is attached to the vehicle roof 14. Camera 12 is lightweight and durable, so as to endure vibrations transmitted from the vehicle, and so as not to unduly interfere with the vehicle's performance. The camera is provided with a stabilizing system so that the camera provides stabilized views from the vehicle. In a preferred embodiment, the camera is equipped with directional motors 16 that can be operated by the participant or can be operated remotely by others, so as to enable a desired repositioning of the camera throughout the motorsports event. The camera is preferably equipped with a microphone and the camera is wired to a transmitter 13 to transmit video and audio information from the camera to a remote receiving station.

Figure 2:
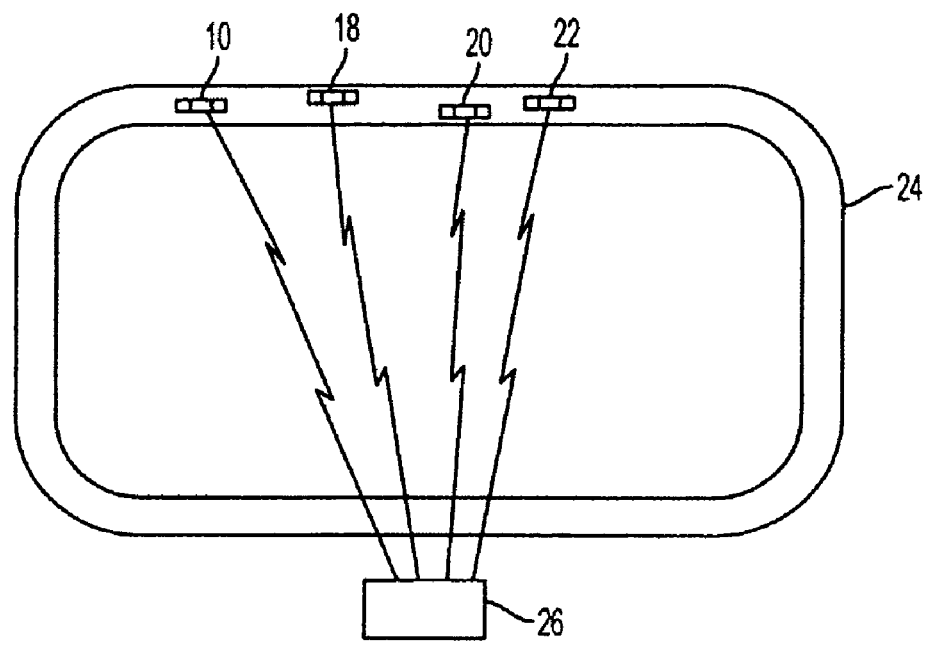
FIG. 2 is a plan view of a track used in a motorsports entertainment event.

As illustrated in FIG. 2, vehicle 10 and other participating vehicles 18, 20 and 22 proceed around a track 24 during the course of the motorsports event. Each of the participating vehicles is equipped with a camera similar to camera 12 of FIG. 1, and each camera is wired to a transmitter similar to transmitter 13. As the vehicles proceed around track 24, data generated by the cameras is transmitted by transmitters 13 to receiving station 26. The cameras are operated throughout the motorsports event, providing substantially continuous feed to the receiving station from the environs of each of the participating vehicles.

Figure 3:
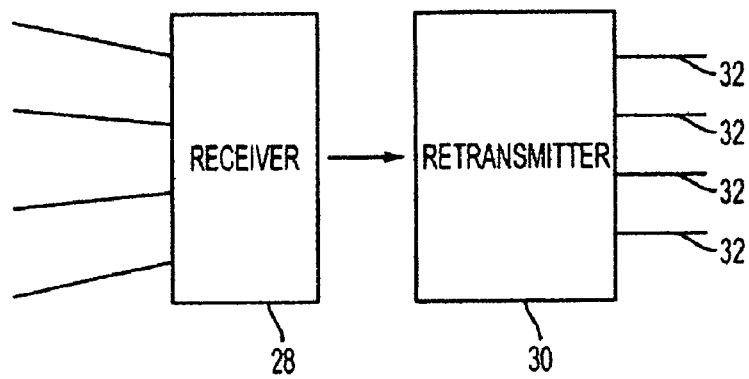
FIG. 3 is a schematic view of equipment at a processing station in accordance with the invention.

FIG. 3 schematically illustrates equipment and operations at the receiving station in a preferred embodiment of the invention. Receiver 28 receives data transmitted from the vehicle-mounted cameras and delivers the information to retransmitter 30. Retransmitter 30 operates in conventional fashion to convert the data, as may be necessary, and direct information representing the plurality of camera feeds to respective channels 32 of a distribution system. In an alternative embodiment, a converter is provided at viewers' locations or between the receiving station and the viewers' location and allows a conversion of data from receiver 28 to data that generates images and sound at viewers' televisions, monitors or other audiovisual equipment. The distribution system may be in the form of a pay-per-view television system or an Internet-type of computer distribution system, and may involve signal transmission by cable or telephone lines or by electrical waves.

Figure 4:
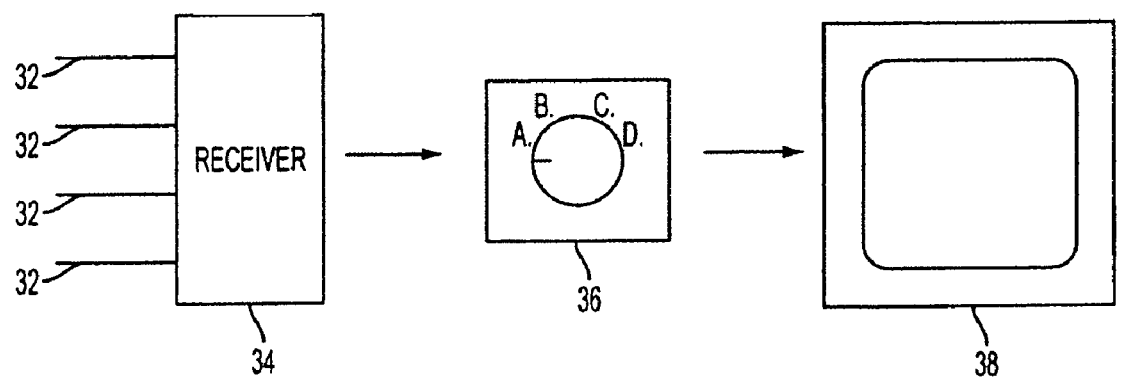
FIG. 4 is a schematic illustration of equipment used by a viewer in accordance with the invention.

Equipment at the site of a viewer is schematically illustrated in FIG. 4. Information representing the plurality of camera feeds is received via respective channels 32 by receiver 34. Selector 36 is operable by the viewer to select from among the various channels that are available. As necessary, receiver 34 also converts the signal received from channels 32 to a signal that generates an image on screen 38. In this fashion, the image appearing on screen 38 is the image captured by the camera associated with the camera of the participant that is of greatest interest to the viewer.

In the preferred embodiment, the equipment at a viewer's station is in the nature of pay-per-view television or in the nature of computer equipment equipped with Internet or other computer network access. Channels 32 are in the nature of pay-per-view channels when the viewer's equipment is in the nature of pay-per-view television. Channels 32 are in the nature of one or more signal transmissions over the Internet when the viewer's equipment is in the nature of computer equipment. Selector 36 is a channel selector in the case of pay-per-view television and is preferably in the nature of a key-selected or mouse-selected option in the case of a computer. In other embodiments, a viewer selects between channels by telephoning or otherwise informing the distributor, who then enables the viewer to receive information representing the view from the camera of choice.

In a further embodiment, the invention allows the viewer to select between camera feed from the perspective of a participant of particular interest, on the one hand, and camera feeds from the perspectives of other participants, or the combination of camera feeds that are selected and incorporated in a standard viewing program of the motorsports event, composed of images selected by the producer, on the other. In a still further embodiment, the viewer is provided a split-screen option, whereby the camera feed from the perspective of the participant of interest is viewed in one part of the screen, while the view from other cameras, optionally in the form of the producer's standard programming of the motorsports event, appears in another portion of the screen. In a still further embodiment, audio and video feeds are selectively receivable by the viewer such that a viewer can select a sound feed from one camera and a video feed from another.

Payment for and control of receipt of desired information is accomplished in a variety of fashions. When the desired information is transmitted through a pay-per-view television system, the pay-per-view signal is scrambled in one embodiment, and the viewer receives an unscrambled signal only upon making suitable arrangements for paying the distributor's viewing charge. When the viewer's equipment is in the nature of computer equipment with Internet access, the viewer is prevented from viewing the screen having the camera feed of interest until the viewer makes suitable arrangements for paying the distributor's charge. The distributor optionally supplies the viewer with a password in order to access the pertinent screen.

The invention provides enhanced opportunities for generating advertising revenue. In either the case of pay-per-view television or transmissions delivered through the Internet, the provider adds banner advertising in a preferred embodiment. The advertising is changeable as the motorsports event progresses, and the provider may optionally intersperse information, such as information about the race or about the race participant, in order to keep the viewer's interest. In a still further embodiment, advertising revenue alone will generate sufficient revenue for the provider, such that images will be provided to viewers free of charge.

In a preferred embodiment, the provider will keep track of viewers' requests for camera feed of the motorsports event as a function of the participant of interest. In this way, the provider will be able to tabulate data and identify those participants of greatest interest to viewers. This data allows providers to more accurately associate viewer interest and advertising revenue with individual participants. This, in turn, allows for a more effective way to satisfy viewer interest, compensate participants, and price advertising opportunities.

Numerous deviations from the preferred embodiment described above can be made within the spirit and scope of the invention. It may, for example, become expedient to provide camera feed for only the participants of highest interest. The particular participants for whom camera feed is made available may be determined by the number of viewer requests for such feed, and in an alternative embodiment, the available feeds may change during the event as the level of interest in particular participants ebbs and flows. In such systems, viewers are given the opportunity to switch mid-event between camera feeds of different participants.

The invention is suitable for sporting events other than motorsports events. These events include but are not limited to skiing, sledding events, harness racing, horse racing, football games, and the like. When a sports event consists of a plurality of short sporting events in which the participants are members of competing teams, such as in Olympic and world championship events, the viewer is in one embodiment given the opportunity to select camera feed from a plurality of cameras positioned on or adjacent to participants of a particular team. In a still further embodiment, camera feed of other classes of participants, such as the predicted winners of various events, is provided.

It will be seen that the above system and method enables a sports entertainment viewer the ability to select continuous camera feed of greatest interest and excitement to the viewer, and thus allows the viewer to virtually participate in the event with the participant of greatest interest, experiencing the same track or field conditions of the participant, experiencing the positioning of the participant in relation to other participants, and experiencing the excitement of the event from the perspective of the participant.

I claim:

1. A method for distributing video images from a perspective of one or more participants in a racing event to at least one individual viewer, the method comprising the steps of:
    operating a first video camera attached to a first vehicle of a first of the one or more participants during the racing event to generate first information regarding video images reflecting the perspective of the first of the one or more participants, wherein the first video camera is directionally repositionable by at least one of the one or more participants or others during the racing event;
    operating a second video camera attached to a second vehicle of a second of the one or more participants during the racing event to generate second information regarding video images reflecting the perspective of the second of the one or more participants, wherein the second video camera is directionally repositionable by at least one of the one or more participants or others during the racing event;
    providing receiving and retransmission equipment adapted to receive the first information and the second information during the racing event, wherein the receiving and retransmission equipment is further adapted to direct the first information to a first channel of a distribution system and the second information to a second channel of the distribution system during the racing event, wherein the distribution system is a television distribution system, the Internet, or other network to which the at least one individual viewer has access;
    receiving the first information and the second information at the receiving retransmission equipment during the racing event;
    directing the first information to the first channel of the distribution system and the second information to the second channel of the distribution system during the racing event,
        whereby the at least one individual viewer is able to select from the first and second channels during the racing event and thereby view the video images of the racing event on a television screen or computer monitor screen; and
    providing the first information to a display based on the at least one individual viewer's selection of the first channel, such that the individual viewer views the racing event from the perspective of the first of the one or more participants.

2. The method of claim 1, wherein the first vehicle includes a device to generate audio signals reflecting the perspective of the first of the one or more participants, and the first information includes the audio signals.

3. The method of claim 1, wherein the distribution system is a television distribution system configured to permit the at least one individual viewer to select from the first and second channels of the television distribution system during the racing event, wherein each of the first and second channels includes video information reflecting the perspective of a respective one of the one or more participants for displaying on a television screen or computer monitor screen.

4. The method of claim 1, wherein the distribution system is the Internet, whereby the at least one individual viewer is able to select from the first and second channels during the racing event by operating keys or a mouse of a computer and thereby view the video images reflecting the perspective of the one or more respective participants on a display device.

5. The method of claim 1, wherein the first information and second information reflects video images from the perspective of a respective first and second participant of the plurality of participants and the distribution system provides a split-screen option, whereby the at least one individual viewer is able to simultaneously view the video images of the racing event from the perspective of a plurality of participants on a split screen.

6. The method of claim 1, wherein the distribution system provides a splitscreen option, whereby the at least one individual viewer is able to simultaneously view, on a split screen, the video images of the racing event both from the perspective of one of the one or more participants and as a standard viewing program of the racing event.

7. The method of claim 1, further comprising
    adding advertising information to at least one of the first information and the second information regarding video images reflecting the perspective of the one or more participants, whereby the at least one individual viewer views the advertising information along with the video images of the racing event.

8. The method of claim 7, further comprising
    including information about the racing event or the one or more participants within the advertising information.

9. A system for distributing video images from a perspective of one or more participants in a racing event to at least one individual viewer, the system comprising:
    a first video camera attached to a first vehicle of a first of the one or more participants in the racing event and adapted to generate first information regarding video images reflecting the perspective of the first of the one or more participants during the racing event, the first video camera being directionally repositionable by at least one of the one or more participants or others during the racing event;

a first transmitter disposed on the first vehicle and adapted to transmit the first information regarding the video images generated by the first video camera during the racing event; and receiving and retransmission equipment adapted to receive the first information transmitted from the first transmitter and second information transmitted from a second transmitter on a second vehicle during the racing event, the receiving and retransmission equipment being further adapted to direct the first information and the second information to first and second respective channels of a distribution system during the racing event for remote viewing by the at least one individual viewer on a television screen or computer monitor screen, wherein the distribution system is a television system, Internet, or other network to which the at least one individual viewer has access, wherein the at least one individual viewer is able to select from among the first channel and the second channel of the distribution system during the racing event and thereby view the video images of the racing event on the television screen or computer monitor screen.

10. The system of claim 9, wherein:
the first channel provides the first information as well as standard viewing program information, such that the at least one individual viewer is able to simultaneously view, on a split screen, the video images of the racing event both from the perspective of the first of the one or more participants and as a standard viewing program of the racing event.

11. The system of claim 10, wherein the first information includes audio information reflecting the perspective of the first of the one or more participants.

12. The system of claim 9, further including:
one or more additional video cameras attached to one or more additional respective vehicles of one or more additional respective participants in the racing event each additional video camera adapted to generate additional information regarding video images reflecting the perspective of the respective additional participant during the racing event; and one or more additional respective transmitters, each disposed on a respective additional vehicle and adapted to transmit the additional information regarding video images generated by a respective additional video camera during the racing event; wherein:

the receiving and retransmission equipment is adapted to receive the additional information from each of the one or more additional transmitters and direct the additional information to one or more additional channels of the distribution system during the racing event for remote viewing by the at least one individual viewer, and wherein the at least one individual viewer is able to select from the first channel, the second channel, and the one or more additional channels of the distribution system during the racing event.

13. A distribution system for distributing information about a racing event to at least one individual viewer, comprising:
receiving equipment configured to:
receive first information from a first transmitter associated with a first directionally repositionable video camera mounted on a first of two or more vehicles in the racing event, the first information including first video information reflecting images from the perspective of a first participant in the racing event;

receive second information from a second transmitter associated with a second directionally repositionable video camera mounted on a second of the two or more vehicles in the racing event, the second information including second video information reflecting images from the perspective of a second participant in the racing event; and retransmission equipment configured to:
direct the received first information and the received second information to a respective first channel and second channel of the distribution system during the racing event, so that the at least one individual viewer is able to select a channel of the distribution system to view at least part of the racing event from the perspective of the first participant, and at least part of the racing event from the perspective of the second participant.

14. The distribution system of claim 13, wherein:
the receiving equipment is configured to receive continuous feeds from each of the first transmitter and second transmitter, as well as from additional transmitters associated with additional directionally repositionable video cameras mounted on additional of the two or more vehicles in the racing event; and the feeds available for viewing are configured to change during the racing event based on the level of interest in particular participants.

15. The distribution system of claim 14, wherein:
the feeds available for viewing are determined based on the actions of a plurality of viewers during the racing event.

16. The distribution system of claim 13, wherein:
the first channel provides the first information as well as standard viewing program information, such that the at least one individual viewer is able to simultaneously view, on a split screen, the video images of the racing event both from the perspective of the first participant and as a standard viewing program of the racing event.

17. The system of claim 13, wherein the first information includes audio information reflecting the perspective of the first participant.

18. The system of claim 13, wherein:
the receiving equipment is further configured to receive additional information from one or more additional transmitters associated with one or more respective video cameras mounted on one or more respective additional vehicles in the racing event, the additional information including additional video information reflecting images from the perspective of a respective participant in the racing event; and the retransmission equipment is further configured to direct the received additional information to one or more additional respective channels of the distribution system during the racing event.

* * * * *